United States Patent
Shibabuki et al.

(10) Patent No.: US 7,053,398 B2
(45) Date of Patent: May 30, 2006

(54) IMAGE INFORMATION READING APPARATUS

(75) Inventors: Tadanobu Shibabuki, Odawara (JP); Naoto Iwakiri, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 134 days.

(21) Appl. No.: 10/458,304

(22) Filed: Jun. 11, 2003

(65) Prior Publication Data

US 2003/0226985 A1   Dec. 11, 2003

Related U.S. Application Data

(63) Continuation-in-part of application No. 09/836,283, filed on Apr. 18, 2001, now abandoned.

(30) Foreign Application Priority Data

Apr. 18, 2000 (JP) .............................. 2000-116305

(51) Int. Cl.
| | |
|---|---|
| G01N 23/04 | (2006.01) |
| G01T 1/105 | (2006.01) |
| G03B 42/08 | (2006.01) |
| G02B 26/10 | (2006.01) |
| G11B 7/135 | (2006.01) |
| B65H 5/00 | (2006.01) |
| B65H 7/00 | (2006.01) |

(52) U.S. Cl. ...................... 250/586; 250/584; 250/585; 250/589

(58) Field of Classification Search ........ 250/580–586, 250/589, 484.4

See application file for complete search history.

(56) References Cited

U.S. PATENT DOCUMENTS

| | | | |
|---|---|---|---|
| 4,346,295 A |   | 8/1982 | Tanaka et al. |
| 4,750,045 A | * | 6/1988 | Ohara et al. ................ 358/494 |
| 4,818,880 A |   | 4/1989 | Matsuda et al. |
| 4,886,967 A | * | 12/1989 | Itakura ....................... 250/589 |
| 4,926,045 A |   | 5/1990 | Hosoi et al. |
| 4,953,038 A | * | 8/1990 | Schiebel et al. ............ 358/471 |
| 5,477,059 A |   | 12/1995 | Arakawa |
| 5,483,081 A |   | 1/1996 | Hosoi |
| 6,239,448 B1 | * | 5/2001 | Kawai ......................... 250/586 |
| 6,365,910 B1 | * | 4/2002 | Otokuni ...................... 250/589 |
| 6,505,413 B1 | * | 1/2003 | Tsutoh ......................... 33/613 |

FOREIGN PATENT DOCUMENTS

| | | |
|---|---|---|
| JP | 55-087970 | 7/1980 |
| JP | 07-159910 | 6/1995 |

* cited by examiner

Primary Examiner—David Porta
Assistant Examiner—Frederick F. Rosenberger
(74) Attorney, Agent, or Firm—Sughrue Mion, PLLC

(57) ABSTRACT

A double-sided stimulable phosphor sheet, which emits light from both sides thereof when exciting light is applied to a recording surface thereof, is fed in an auxiliary scanning direction indicated by the arrow A by first and second roller pairs. First and second guide members are disposed on the side of the reverse surface of the stimulable phosphor sheet, for guiding the stimulable phosphor sheet, and a glass guide is disposed on the side of the reverse surface of the stimulable phosphor sheet in a position where a laser beam is applied to the stimulable phosphor sheet. The first and second guide members and the glass guide are integrally mounted on a guide mount. Radiation image information recorded on the stimulable phosphor sheet can efficiently be read highly accurately without damage being caused to the stimulable phosphor sheet.

20 Claims, 4 Drawing Sheets

IMAGE INFORMATION READING APPARATUS

CROSS REFERENCE TO RELATED APPLICATIONS

This is a Continuation-In-Part of application Ser. No. 09/836,283 filed Apr. 18, 2001, now abandoned the disclosure of which is incorporated herein by reference.

BACKGROUND OF THE INVENTION

1. Field of the Invention

The present invention relates to an image information reading apparatus for reading radiation image information recorded on a double-sided stimulable phosphor sheet which emits light from both sides thereof when exciting light is applied to a recording surface thereof.

2. Description of the Related Art

A system is known for recording radiation image information of a subject such as a human body with a stimulable phosphor, and reproducing the recorded radiation image information on a photosensitive medium such as a photographic film, or displaying the recorded radiation image information on a display device such as a CRT or the like.

When a radiation energy such as X-rays, α-rays, γ-rays, electron beams, ultraviolet radiation, or the like is applied to a certain phosphor, it stores part of the applied radiation energy. When exciting light such as visible light is subsequently applied to the phosphor, the phosphor emits light depending upon the stored radiation energy. Such a phosphor is referred to as a stimulable phosphor. A stimulable phosphor is usually used in the form of a sheet which is referred to as a stimulable phosphor sheet.

The above known system includes an image information reading apparatus which comprises a reading unit for reading image information recorded on a stimulable phosphor sheet, and an erasing assembly for erasing remaining image information from the stimulable phosphor sheet after the recorded image information has been read. In the image information reading apparatus, a cassette housing a stimulable phosphor sheet which bears radiation image information of a subject recorded by an external exposure device is inserted into a loading unit.

Thereafter, the lid of the cassette is opened, and then the stimulable phosphor sheet is taken out of the cassette by a sheet feeding mechanism. The stimulable phosphor sheet is delivered to the reading unit by a sheet delivering mechanism. In the reading unit, the recorded image information is read from the stimulable phosphor sheet, and then the remaining image information is erased from the stimulable phosphor sheet in the erasing assembly, after which the stimulable phosphor sheet is placed into the cassette which has been disposed in the loading unit.

It has been desired to efficiently read the energy that has been stored in the stimulable phosphor sheet as in the field of mammography. To meet such a demand, there has been an attempt to use a transparent base in the stimulable phosphor sheet. When the exciting light is applied to the stimulable phosphor sheet from the side of a phosphor layer (recording surface) thereof, the stimulable phosphor sheet emits light from the base (reverse surface) as well as the phosphor layer. Therefore, the reading unit has two light guiding means disposed respectively on both sides of the stimulable phosphor sheet for guiding the light emitted therefrom.

The reading unit has a structure with roller pairs for gripping and feeding the stimulable phosphor sheet while holding the reverse surface thereof in contact with guide means in order to read the recorded radiation image information highly accurately. The guide means comprises a plurality of separate guide means at the position where the exciting light is applied to the stimulable phosphor sheet, for guiding the emitted light to the guiding means that is disposed on the side of the reverse surface of the stimulable phosphor sheet.

When the stimulable phosphor sheet is transferred from one of the guide means to the other guide means in the vicinity of the position where the exciting light is applied to the stimulable phosphor sheet, the stimulable phosphor sheet is brought into direct contact with the other guide means comprising, for example, a glass guide, possibly resulting in damage caused to the reverse surface of the stimulable phosphor sheet. Another problem is that, when the leading end of the stimulable phosphor sheet abuts against the other guide means, the stimulable phosphor sheet is caused to flutter, and the image read therefrom suffers undesirable irregularities.

SUMMARY OF THE INVENTION

It is a major object of the present invention to provide an image information reading apparatus which is capable of reading a recorded image highly accurately from a double-sided stimulable phosphor sheet without causing damage thereto.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
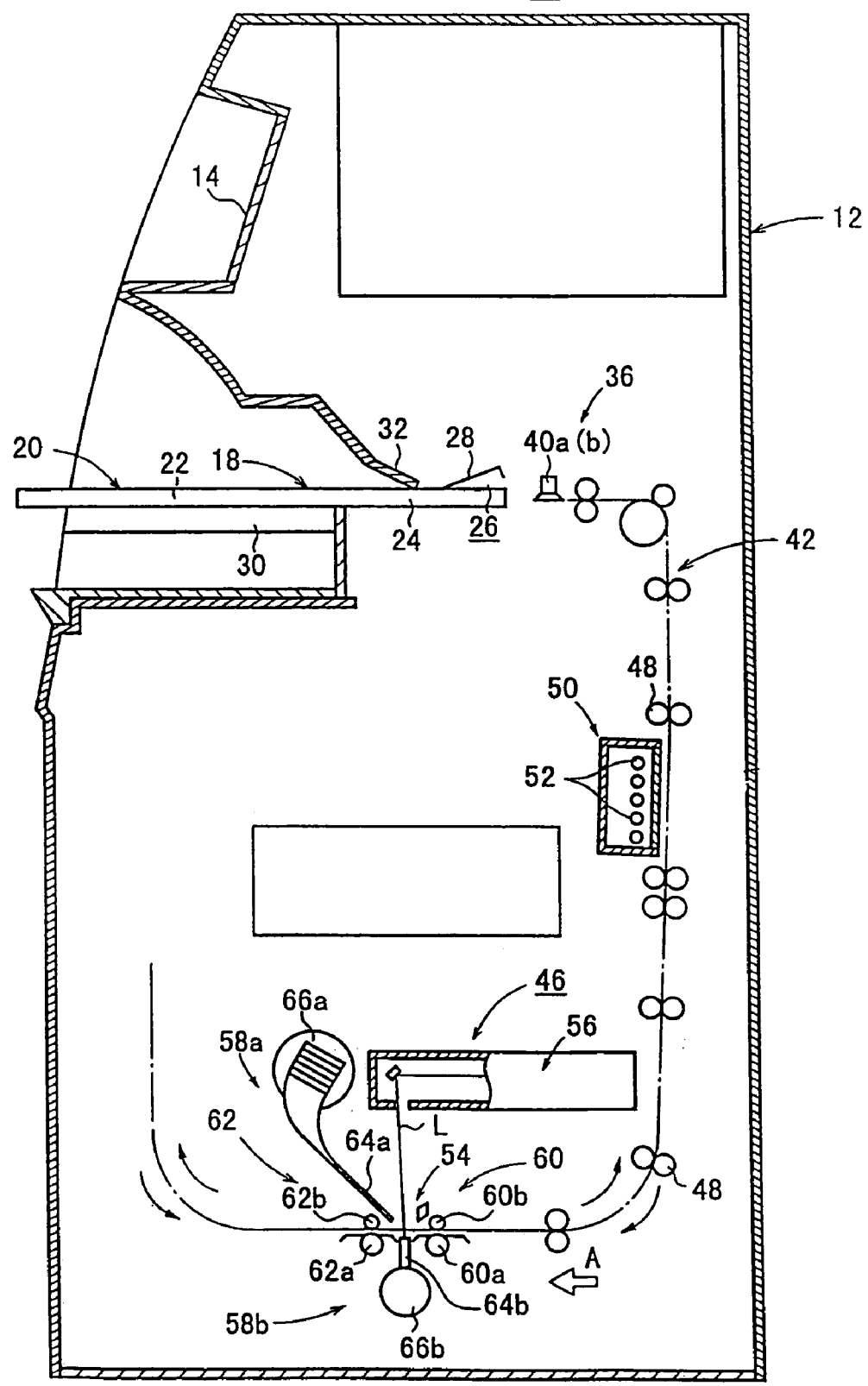
FIG. 1 is a schematic vertical cross-sectional view of an image information reading apparatus according to the present invention.

FIG. 1 shows in schematic vertical cross section an image information reading apparatus 10 according to the present invention.

As shown in FIG. 1, the image information reading apparatus 10 has an apparatus housing 12 including a front wall (control wall) which supports on its upper portion a touch panel 14 that functions as controls and a display monitor. The apparatus housing 12 accommodates therein a cassette loading region 20 for removably holding a cassette 18. The cassette loading region 20 is disposed below the touch panel 14.

The cassette 18 comprises a casing 24 for housing a stimulable phosphor sheet 22 and a lid 28 by which an opening 26 in the casing 24 is openably closed. The stimulable phosphor sheet 22 comprises a double-sided stimulable phosphor sheet having a transparent base with a recording surface thereon, and emits light bearing recorded radiation image information from both sides thereof when irradiated with exciting light.

The cassette loading region 20 has a support base 30 for placing the cassette 18 thereon, and a shutter 32 for blocking light against entry into the apparatus housing 12. The cassette loading region 20 also has a sheet feeder 36 for removing the stimulable phosphor sheet 22 from the cassette 18 and returning the stimulable phosphor sheet 22 into the cassette 18 after recorded radiation image information has been read from the stimulable phosphor sheet 22 and after remaining radiation image information has been erased from the stimulable phosphor sheet 22. The sheet feeder 36 has suction cups 40a, 40b that are movable into the cassette 18 whose lid 28 is opened in the cassette loading region 20.

The apparatus housing 12 houses therein an erasing device 50 and a reading unit 46 which are disposed below the sheet feeder 36 with a feed system 42 interposed therebetween. The feed system 42 has a plurality of roller pairs 48 making up a vertical feed path, with the erasing device 50 disposed on one side thereof. The erasing assembly 50 comprises an erasing assembly 50 disposed on the side of the recording surface of the stimulable phosphor sheet 22. The erasing assembly 50 comprises a vertical array of erasing light sources 52.

The roller pairs 48 also make up a horizontal feed path, with the reading unit 46 disposed on one side thereof. The reading unit 46 comprises an auxiliary scanning feeding mechanism 54 for delivering the stimulable phosphor sheet 22 taken from the cassette 18 in an auxiliary scanning direction indicated by the arrow A, a laser beam applying means (exciting light applying means) 56 for applying a laser beam L as it is deflected in a main scanning direction (substantially perpendicular to the auxiliary scanning direction) to the recording surface of the stimulable phosphor sheet 22 as it is delivered in the auxiliary scanning direction, and first and second light guiding systems (light guiding means) 58a, 58b for photoelectrically reading light which is emitted from the stimulable phosphor sheet 22 when the stimulable phosphor sheet 22 is exposed to the laser beam L.

The auxiliary scanning feeding mechanism 54 has first and second roller pairs 60, 62 rotatable in synchronism with each other. The first and second roller pairs 60, 62 have drive rollers 60a, 62a and nip rollers 60b, 62b that can be moved toward and away from the drive rollers 60a, 62a.

The first light guiding system 58a comprises a first light guide 64a extending along a main scanning line in the position over the recording surface of the stimulable phosphor sheet 22 where the laser beam L is applied, and a first photomultiplier 66a mounted on an upper end of the first light guide 64a. The second light guiding system 58b is disposed on the side of the reverse surface of the stimulable phosphor sheet 22, and comprises a second light guide 64b extending along a main scanning line over the reverse surface of the stimulable phosphor sheet 22, and a second photomultiplier 66b mounted on a lower end of the second light guide 64b.

Figure 2:
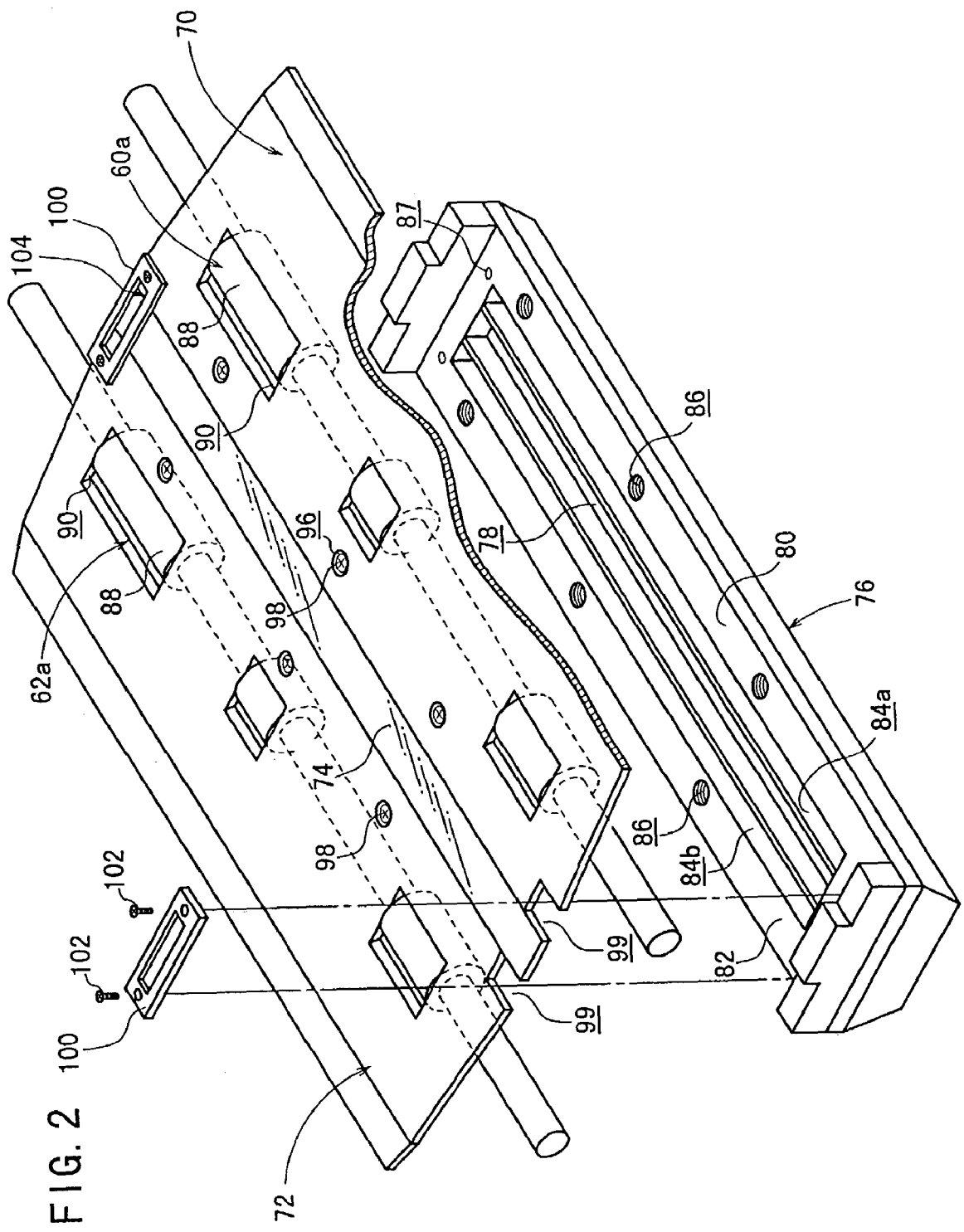
FIG. 2 is a fragmentary exploded perspective view of a reading unit of the image information reading apparatus shown in FIG. 1.
Figure 3:
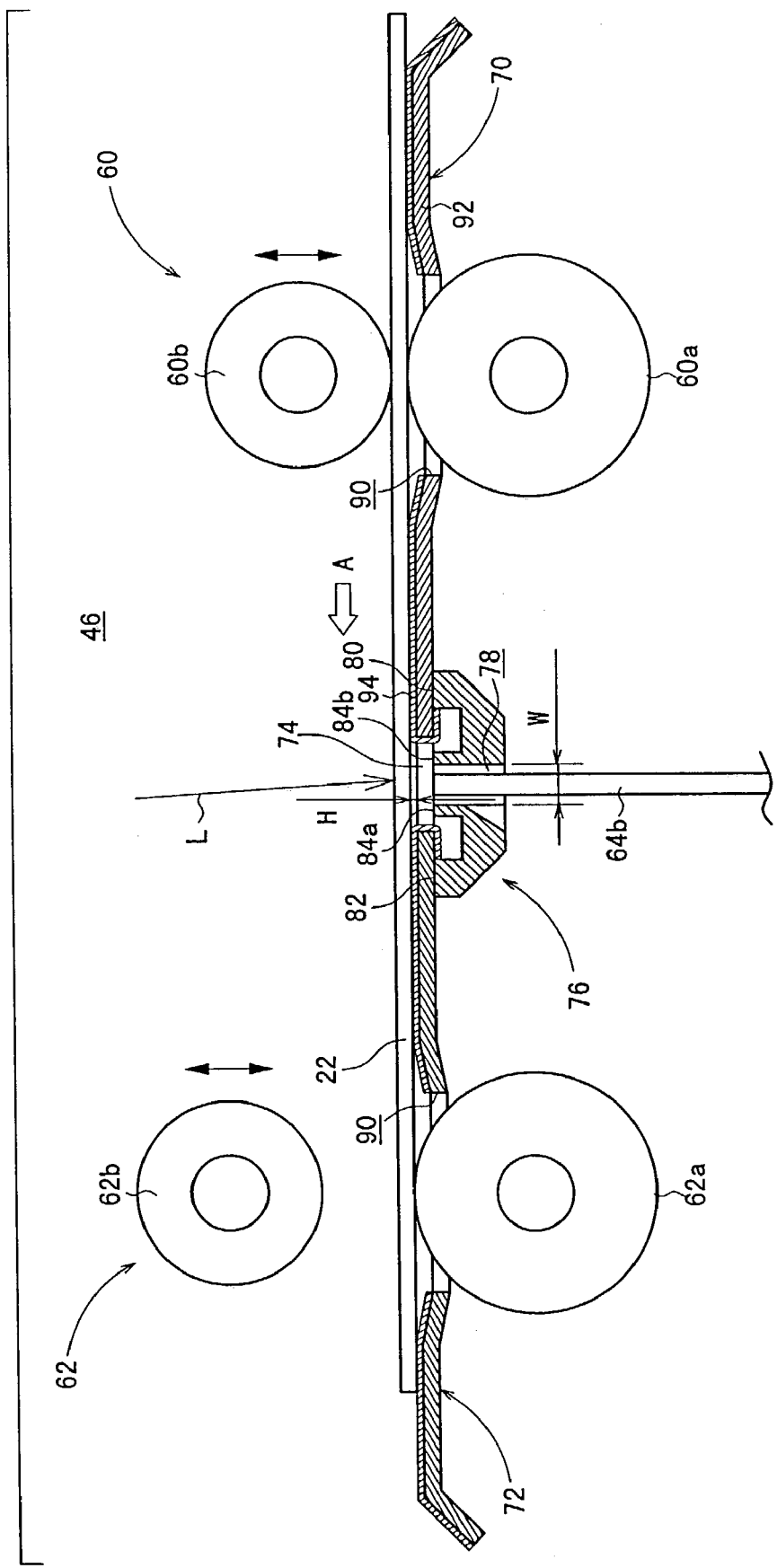
FIG. 3 is a front elevational view, partly in cross section, of the reading unit shown in FIG. 2.

As shown in FIGS. 2 and 3, the reading unit 46 comprises first and second guide members (first guide means) 70, 72 disposed on the side of the reverse surface of the stimulable phosphor sheet 22, for guiding the stimulable phosphor sheet 22 in the direction indicated by the arrow A, and a light-transmissive guide member (second guide means), e.g., a glass guide 74, disposed between the first and second guide members 70, 72 and located in the position over the recording surface of the stimulable phosphor sheet 22 where the laser beam L is applied. The first and second guide members 70, 72 and the glass guide 74 are integrally held by a guide mount 76.

The guide mount 76 is elongate in the main scanning direction of the laser beam L, and has an opening 78 defined therein along the main scanning line of the laser beam L. The opening 78 is of a width that is large enough to allow the second light guide 64b of the second light guiding system 58b to pass therethrough. The guide mount 76 has on its upper end first and second mount surfaces 80, 82 on which the first and second guide members 70, 72 are mounted, and third and fourth mount surfaces 84a, 84b on which the glass guide 74 is mounted. The first and second mount surfaces 80, 82 have a plurality of screw holes 86 and small-diameter screw holes 87 that are defined therein at spaced intervals.

The first guide member 70 extends fully across the stimulable phosphor sheet 22 along the main scanning direction and from a position upstream of the first roller pair 60 to a position near the main scanning line. The first guide member 70 has a plurality of openings 90 defined therein which receive respective roller surfaces 88 of the drive roller 60a of the first roller pair 60. The first guide member 70 comprises a plate 92 and a damper 94 on the upper surface of the plate 92 for contact with the stimulable phosphor sheet 22. The damper 94 is made of woven or nonwoven fabric of polyester or the like, and extends from the upper surface of the plate 92 along an end face juxtaposed to the glass guide 74 to an opposite lower surface of the plate 92.

The first guide member 70 has holes 96 defined therein in alignment with the screw holes 86 defined in the guide mount 76, and is fastened to the guide mount 76 by screws 98 that are threaded through the holes 96 into the screw holes 86. The first guide member 70 has recesses 99 defined in opposite ends thereof over which glass guide holders 100 are positioned. When screws 102 are threaded through the glass guide holders 100 into the screw holes 87, the glass guide 74 is fastened to the guide mount 76. The second guide member 72 is of a structure identical to the first guide member 70. Those parts of the second guide member 72 which are identical to those of the first guide member 70 are denoted by identical reference characters, and will not be described in detail below.

The glass guide 74 has an antireflection coating on its reverse surface that faces the second light guide 64b for reducing reflections of the laser beam L and increasing the transmittance of the light emitted from the stimulable phosphor sheet 22. The glass guide 74 has a beveled corner 104 that is used to distinguish the face side from the reverse side of the glass guide 74.

As shown in FIG. 3, with the first and second guide members 70, 72 and the glass guide 74 being mounted on the guide mount 76, the surface of the damper 94 of each of the first and second guide members 70, 72 is closer to the stimulable phosphor sheet 22 than the surface of the glass guide 74 by a distance H ranging from 0.1 mm to 0.2 mm.

Operation of the image information reading apparatus 12 thus constructed will be described below.

A cassette 18 which stores a stimulable phosphor sheet 22 which carries radiation image information of a subject such as a human body recorded by an exposure device (not shown) is introduced into the apparatus housing 12 along the support base 30 of the cassette loading region 20. As the cassette 18 is introduced, the leading end of the cassette 18 pushes open the shutter 32 and enters the interior space of the apparatus housing 12, opening the lid 28 to a certain angular position.

The suction cups 40a, 40b of the sheet feeder 36 then move along a path extending from an upper position downwardly obliquely toward the base of the stimulable phosphor sheet 22 in the cassette 18. When the suction cups 40a, 40b attracts the base of the stimulable phosphor sheet 22, the suction cups 40a, 40b move out of the cassette 18 toward the feed system 42 until the leading end of the stimulable phosphor sheet 22 is gripped by the first roller pair 48 of the feed system 42. As the roller pairs 48 rotate, the stimulable phosphor sheet 22 is fed horizontally and then vertically downwardly through the erasing assembly 50, after which the stimulable phosphor sheet 22 is fed horizontally to the reading unit 46.

In the reading unit 46, the stimulable phosphor sheet 22 is fed in the auxiliary scanning direction indicated by the arrow A by the first and second roller pairs 60, 62 of the auxiliary scanning feeding mechanism 54. At the same time, the laser beam L emitted from the laser beam applying means 56 is applied to the recording surface of the stimulable phosphor sheet 22 while it is being deflected in the main scanning direction.

Light emitted from the recording surface of the stimulable phosphor sheet 22 is photoelectrically read by the first light guiding system 58a, and light emitted from the reverse surface of the stimulable phosphor sheet 22 is photoelectrically read by the second light guiding system 58b. Accordingly, the recorded radiation image information can be read with increased accuracy. The reading unit 46 which operates in the manner described above is effectively suitable for achieving a high level of image quality such as in the field of mammography.

The stimulable phosphor sheet 22 from which the desired radiation image information has been read is switched back in the auxiliary scanning feeding mechanism 54, and fed vertically upwardly through the erasing unit 50 of the erasing assembly 50 to the sheet feeder 36. In the erasing assembly 50, the erasing light sources 52 of the erasing unit 50 are energized to apply erasing light to both surface of the stimulable phosphor sheet 22, erasing remaining radiation image information from the stimulable phosphor sheet 22. The stimulable phosphor sheet 22 is then returned into the empty cassette 18 by the suction cups 40a, 40b of the sheet feeder 36.

As shown in FIG. 3, the glass guide 74 is disposed in the position where the laser beam L is applied, and the first and second guide members 70, 72 are disposed near the opposite ends of the glass guide 74. Therefore, the light emitted from the reverse surface of the stimulable phosphor sheet 22 passes through the glass guide 74 and is reliably applied to the second light guide 64b. Consequently, the radiation image information recorded in the stimulable phosphor sheet 22 is read with increased accuracy.

Each of the first and second guide members 70, 72 has the damper 94 on its surface for contact with the base of the stimulable phosphor sheet 22, and the surface of the glass guide 74 facing the stimulable phosphor sheet 22 is spaced from the stimulable phosphor sheet 22 by the distance H. Consequently, the reverse surface of the stimulable phosphor sheet 22 is not damaged by contact with the first and second guide members 70, 72, and is not damaged by the glass guide 74 as it is held out of contact with the glass guide 74. The leading end of the stimulable phosphor sheet 22 is prevented from being caught by the glass guide 74 when it is transferred from the first guide member 70 across the glass guide 74 to the second guide member 72.

The stimulable phosphor sheet 22 is thus smoothly transferred from the first guide member 70 across the glass guide 74 to the second guide member 72. Since the stimulable phosphor sheet 22 is prevented from fluttering at this time, the image read from the stimulable phosphor sheet 22 is free of undesired irregularities.

The damper 94 extends from the upper surface of the plate 92 so as to cover the end face thereof which is juxtaposed to the glass guide 74. Therefore, when the stimulable phosphor sheet 22 is transferred from the first guide member 70 across the glass guide 74 to the second guide member 72, the leading end of the stimulable phosphor sheet 22 is prevented from being caught by the edges of the plates 92. Thus, the stimulable phosphor sheet 22 can be fed smoothly and highly accurately in the auxiliary scanning direction indicated by the arrow A.

As shown in FIG. 2, the first and second guide members 70, 72 are placed on and fastened to the first and second mount surfaces 80, 82 of the guide mount 76 by the screws 98. The glass guide 74 is placed on the third mount surfaces 84a, 84b of the guide mount 76, and has its opposite ends fixed in position by the respective glass guide holders 100. Accordingly, the first and second guide members 70, 72 and the glass guide 74 can reliably be held in their relative positions depending on the machining accuracy of the guide mount 76. The first and second guide members 70, 72 and the glass guide 74 can thus be positioned with high accuracy by the simple structure.

Figure 4:
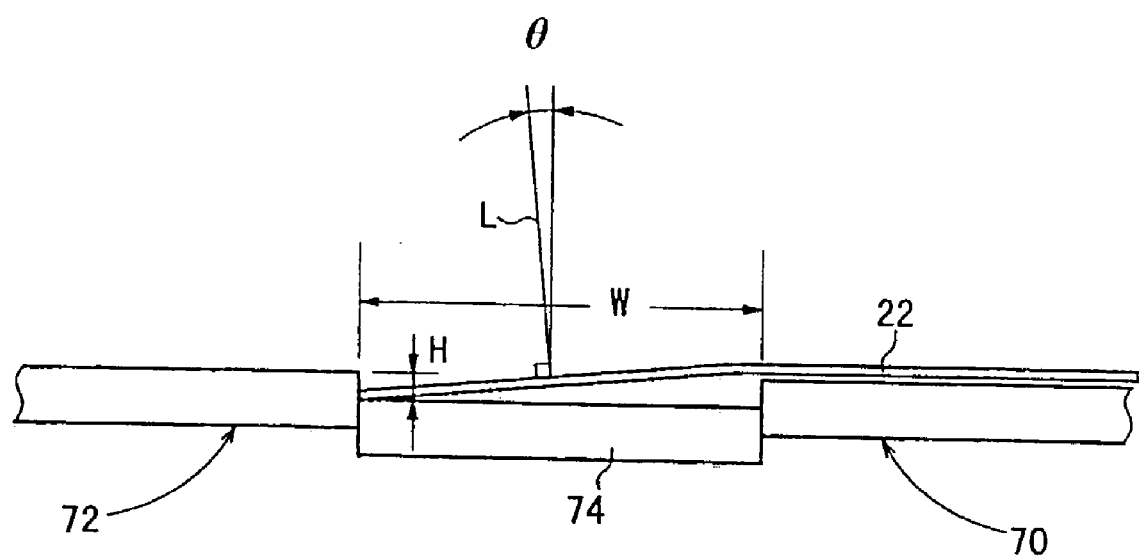
FIG. 4 is a view showing parameters to set up a condition for preventing a laser beam from straying.

A condition may be set up to prevent a regularly reflected component of the laser beam L from returning to the optical system of the reading unit 46 when the leading end of the stimulable phosphor sheet 22 enters the boundary between the glass guide 74 and the second guide member 72. Specifically, as shown in FIG. 4, it is assumed that the glass guide 74 has a width W, the laser beam L is applied to the stimulable phosphor sheet 22 at an incident angle $\theta$ (which is positive in a clockwise direction in FIG. 4), and the distance from the surface of the first and second guide members 70, 72 for guiding the stimulable phosphor sheet 22 to the surface of the glass guide 74 is represented by H.

If the incident angle $\theta$ of the laser beam L is in the range of $0 \leq \theta \leq \tan^{-1}(H/W)$, then when the leading end of the stimulable phosphor sheet 22 flexes over the glass guide 74 in front of the second guide member 72, the laser beam L may be applied perpendicularly to the stimulable phosphor sheet 22. At this time, a regularly reflected component of the laser beam L from the stimulable phosphor sheet 22 returns as a stray beam in the direction in which the laser beam L is applied to the stimulable phosphor sheet 22. The stray beam thus traveling back in the optical system tends to disturb the oscillating state of the laser oscillator and also to disturb the controlling operation of APC and ACC circuits, causing the amount of light of the laser beam L to vary unexpectedly to introduce noise in the image read from the stimulable phosphor sheet 22.

In the present embodiment, the above shortcomings can effectively be avoided if the incident angle $\theta$ of the laser beam L is in the range of $\theta > \tan^{-1}(H/W)$ or $\theta < 0$.

Also, if the incident angle $\theta$ of the laser beam L is in the range of $0 \geq \theta \geq -\tan^{-1}(H/W)$, then when the trailing end of the stimulable phosphor sheet 22 moves across the first guide member 70 and the stimulable phosphor sheet 22 flexes over the glass guide 74, the laser beam L may be applied perpendicularly to the stimulable phosphor sheet 22. Thus, as well as the leading end of the stimulable phosphor sheet 22, the shortcomings in the trailing end of the stimulable phosphor sheet 22 can effectively be avoided if the incident angle $\theta$ of the laser beam L is in the range of $\theta > 0$ or $\theta < -\tan^{-1}(H/W)$.

In the above embodiment, the light-transmissive guide member comprises the glass guide 74. However, the light-transmissive guide member may be made of a relatively less damageable material such as an acrylic resin or the like. In the auxiliary scanning feeding mechanism 54, the first and second guide members 70, 72 and the glass guide 74 are shown as being flat for feeding the stimulable phosphor sheet 22 along a flat feed path. However, if the auxiliary scanning feeding mechanism 54 provides a curved feed path, the first and second guide members 70, 72 and the glass guide 74 may be of a curved shape.

In the image information reading apparatus according to the present invention, since the guide members and the light-transmissive guide member are disposed on the side of the reverse surface of the stimulable phosphor sheet, with the light-transmissive guide member being disposed in the position where the exciting light is applied to the stimulable phosphor sheet, light emitted from the reverse surface of the stimulable phosphor sheet is reliably guided through the light-transmissive guide member. Thus, the radiation image information recorded on the stimulable phosphor sheet can be read highly accurately with a simple arrangement.

Although a certain preferred embodiment of the present invention has been shown and described in detail, it should be understood that various changes and modifications may be made therein without departing from the scope of the appended claims.

What is claimed is:

1. An apparatus for reading radiation image information recorded on a double-sided stimulable phosphor sheet which emits light from both sides thereof when exciting light is applied to a recording surface thereof, comprising:
    exciting light emitting means disposed on a side of the recording surface of the stimulable phosphor sheet, for applying the exciting light to said recording surface;
    first light guiding means disposed on the side of the recording surface, for guiding light emitted from the recording surface of said stimulable phosphor sheet;
    second light guiding means disposed on a side of a reverse surface, opposite from the side of the recording surface, of the stimulable phosphor sheet, for guiding light emitted from the reverse surface of said stimulable phosphor sheet;
    a guide member disposed on the side of the reverse surface of said stimulable phosphor sheet, for guiding said stimulable phosphor sheet: and
    a light-transmissive guide member disposed on the side of the reverse surface of said stimulable phosphor sheet in a position where the exciting light is applied to the stimulable phosphor sheet,
    wherein said guide member is substantially stationary.

2. An apparatus according to claim 1, wherein said guide member has a damper disposed on a surface thereof for contact with said stimulable phosphor sheet, said damper having a surface closer to the stimulable phosphor sheet than a surface of said light-transmissive member facing said stimulable phosphor sheet.

3. An apparatus according to claim 2, wherein said damper extends from the surface of said guide member to an end face thereof juxtaposed to said light-transmissive member.

4. An apparatus according to claim 1, wherein said light-transmissive member has an antireflection coating on a surface thereof which faces said second light guiding means.

5. The apparatus according to claim 1, wherein said first light guiding means and said second light guiding means extend along a main scanning line.

6. The apparatus according to claim 1, wherein said guide member has a substantially horizontal surface.

7. The apparatus according to claim 1, wherein said light-transmissive guide member has a beveled corner.

8. The apparatus according to claim 1, further comprising a conveyance device configured to feed said double-sided stimulable phosphor sheet through said apparatus.

9. The apparatus according to claim 1, wherein said light-transmissive guide member does not reflect said exciting light toward said stimulable phosphor sheet.

10. An apparatus for reading radiation image information recorded on a double-sided stimulable phosphor sheet which emits light from both sides thereof when exciting light is applied to a recording surface thereof, comprising:
    exciting light emitting means disposed on a side of the recording surface of the stimulable phosphor sheet, for applying the exciting light to said recording surface;
    first light guiding means disposed on the side of the recording surface, for guiding light emitted from the recording surface of said stimulable phosphor sheet;
    second light guiding means disposed on a side of a reverse surface, opposite from the side of the recording surface, of the stimulable phosphor sheet, for guiding light emitted from the reverse surface of said stimulable phosphor sheet;
    a guide member disposed on the side of the reverse surface of said stimulable phosphor sheet, for guiding said stimulable phosphor sheet: and
    a light-transmissive guide member disposed on the side of the reverse surface of said stimulable phosphor sheet in a position where the exciting light is applied to the stimulable phosphor sheet,
    wherein said guide member comprises first and second guide members disposed on each side of said light-transmissive member, and a guide mount, said first and second guide members and said light-transmissive member being integrally mounted on said guide mount.

11. The apparatus according to claim 10, wherein said guide mount is elongate in a main scanning direction.

12. The apparatus according to claim 10, wherein said first and second guide members are affixed to said guide mount, and are provided above said guide mount.

13. The apparatus according to claim 10, wherein said first and second guide members are affixed to said guide mount, and are provided closer to said first light guiding means than said guide mount.

14. An apparatus for reading radiation image information recorded on a double-sided stimulable phosphor sheet which emits light from both sides thereof when exciting light is applied to a recording surface thereof, comprising:
    first guide means disposed on the side of a reverse surface, remote from said recording surface, of the stimulable phosphor sheet, for guiding said stimulable phosphor sheet along a flat or curved feed path, said first guide means having an opening defined in at least a portion of a surface thereof which is scanned by said exciting light; and
    second guide means disposed in said opening and more spaced from said stimulable phosphor sheet than said first guide means;
    the arrangement being such that the incident angle $\theta$ at which said exciting light is applied to the recording surface of the stimulable phosphor sheet falls in a range of $\theta > \tan^{-1}(H/W)$ or $\theta < 0$ wherein, when viewed from a side of a feed direction of the stimulable phosphor sheet when said sheet is inclined to the feed direction, the angle $\theta$ is determined as an angle between an axis perpendicular to a plane of a feed path of the stimulable phosphor sheet and an incident ray of said exciting light, H represents the distance from an upper plane of said first guide means to an upper plane of said second guide means and W represents the width of said opening.

15. An apparatus according to claim 14, wherein said second guide means comprises a light-transmissive member.

16. The apparatus according to claim 14, wherein said first guide means is substantially stationary.

17. An apparatus for reading radiation image information recorded on a double-sided stimulable phosphor sheet which emits light from both sides thereof when exciting light is applied to a recording surface thereof, comprising:

exciting light emitting means disposed on a side of the recording surface of the stimulable phosphor sheet, for applying the exciting light to said recording surface;

first light guiding means disposed on the side of the recording surface, for guiding light emitted from the recording surface of said stimulable phosphor sheet;

second light guiding means disposed on a side of a reverse surface, opposite from the side of the recording surface, of the stimulable phosphor sheet, for guiding light emitted from the reverse surface of said stimulable phosphor sheet;

a guide member disposed on the side of the reverse surface of said stimulable phosphor sheet, for guiding said stimulable phosphor sheet; and a light-transmissive guide member disposed on the side of the reverse surface of said stimulable phosphor sheet in a position where the exciting light is applied to the stimulable phosphor sheet, wherein said guide member is physically connected to said light transmissive guide member.

18. An apparatus for reading radiation image information recorded on a double-sided stimulable phosphor sheet which emits light from both sides thereof when exciting light is applied to a recording surface thereof, comprising;

first guide means disposed on the side of a reverse surface, remote from said recording surface, of the stimulable phosphor sheet, for guiding said stimulable phosphor sheet along a flat or curved feed path, said first guide means having an opening defined in at least a portion of a surface thereof which is scanned by said exciting light; and second guide means disposed in said opening and more spaced from said stimulable phosphor sheet than said first guide means;

the arrangement being such that the incident angle $\theta$ at which said exciting light is applied to the recording surface of the stimulable phosphor sheet falls in a range of $\theta>0$ or $\theta<-\tan^{-1}(H/W)$ wherein, when viewed from a side of a feed direction of the stimulable phosphor sheet when said sheet is inclined to the feed direction because of a trailing end of said sheet, the angle $\theta$ is determined as an angle between an axis perpendicular to a plane of a feed path of the stimulable phosphor sheet and an incident ray of said exciting light, H represents the distance from an upper plane of said first guide means to an upper plane of said second guide means and W represents the width of said opening.

19. The apparatus according to claim 18, wherein said second guide means comprises a light-transmissive member.

20. The apparatus according to claim 18, wherein said first guide means is substantially stationary.

* * * * *